US006681366B1

(12) United States Patent
Smith

(10) Patent No.: US 6,681,366 B1
(45) Date of Patent: Jan. 20, 2004

(54) SYSTEM AND METHOD FOR DETECTING ERRORS IN A SYSTEM WHERE CLIENTS ARBITRATE AMONGST THEMSELVES FOR A GRANT TO A CENTRAL RESOURCE

(75) Inventor: Brian L. Smith, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/569,986

(22) Filed: May 11, 2000

(51) Int. Cl.[7] .......................... G06F 11/00; G06F 15/16; G06F 13/38
(52) U.S. Cl. ..................... 714/800; 710/240; 709/203; 709/240
(58) Field of Search ................................ 714/800, 799, 714/712, 715, 4, 43, 44, 47; 710/240, 241, 244, 40, 107; 709/100, 200, 207, 208, 209

(56) References Cited

U.S. PATENT DOCUMENTS 5,155,735 A * 10/1992 Nash et al. ................. 714/800
5,557,753 A * 9/1996 Suenaga et al. ............ 710/107
6,058,449 A   5/2000 Linzmeier et al. .......... 710/107
6,295,553 B1 * 9/2001 Gilbertson et al. ......... 709/207

* cited by examiner

Primary Examiner—Christine T. Tu
(74) Attorney, Agent, or Firm—Meyertons Hood Kivlin Kowert & Goetzel, P.C.; B. Noël Kivlin

(57) ABSTRACT

A system and method for detecting parity errors in a system where clients are configured to arbitrate amongst themselves for a grant to a central resource is provided. A client may send a request for access to the central resource to all other clients. In the event that multiple clients request access to the central resource substantially simultaneously, the clients may each determine which client should be granted the right to send its request to the central resource. The clients may make this determination according to an arbitration scheme. Where multiple requests occur substantially simultaneously, each client may calculate a parity based on the number of requests it receives. The clients may each convey their parity to the central resource. The clients may convey these parities to the central resource at about the same time as the granted request is conveyed to the central resource by its respective client. The central resource may determine that an error has occurred based on the parities received from the clients. If an error occurs, the central resource may generate an error signal and convey the error signal to a system controller.

22 Claims, 5 Drawing Sheets

SYSTEM AND METHOD FOR DETECTING ERRORS IN A SYSTEM WHERE CLIENTS ARBITRATE AMONGST THEMSELVES FOR A GRANT TO A CENTRAL RESOURCE

BACKGROUND OF THE INVENTION

1. Field of the Invention

This invention relates generally to the field of computer systems and, more particularly, to detecting errors in systems where clients arbitrate amongst themselves for a grant to a central resource.

2. Description of the Related Art

Modern computer systems may include many clients, such as microprocessors or other devices, which perform many functions. Regardless of the function a client may perform, a client may share a central resource in the computer system. The central resource may be any device that performs a specialized function.

Clients may be configured to arbitrate amongst themselves for a grant to a central resource. Each client may receive the requests from all other clients and the clients may each be configured to determine which client is granted the right to access the central resource at a given time. In order for this type of arbitration to work, the clients need to receive all of the requests from other clients so that two or more clients do not send conflicting requests to the central resource substantially simultaneously. One way to determine if each client is receiving the requests of all of the other clients is for each client to send a parity calculation to every other client along with a request. Such a system is illustrated in FIG. 1.

FIG. 1 depicts clients 110a, 110b, and 110c coupled to central resource 100. Clients 110a, 110b, and 110c are also coupled to one another by request lines and parity lines. In FIG. 1, the solid lines are intended to indicate request lines and the dotted lines are intended to indicate parity lines. As can be seen, each client 110a, 110b, and 110c has a request line and a parity line coupled to every other client. In this system, each client 110a, 110b, and 110c may be configured to detect errors pertaining to requests sent from the clients based on the parity signals received from the other clients. A client that detects an error may signal the error condition to the central resource and the central resource may inform a system controller that an error has been detected.

The system of FIG. 1 requires a parity line from and to each client in order to detect errors. As clients are added to the system, the number of parity lines may increase exponentially as each new client adds additional parity lines. In the system of FIG. 1, for example, six parity lines are used where there are three clients. If a fourth client is added, twelve parity lines are needed as the fourth client adds an additional two parity lines between itself and each of the other clients. Similarly, if a fifth client is added, twenty parity lines are needed as the fifth client adds an additional two parity lines between itself and each of the other clients.

In addition, each client in the system of FIG. 1 needs to be configured to detect parity errors. Thus, each client may need additional hardware or software to perform this task. A system and method are needed to reduce the number of parity lines required to perform error detection in a system where clients arbitrate amongst themselves for a grant to a central resource. In addition, a system and method are needed to reduce the amount of hardware or software needed to perform error detection in such a system.

SUMMARY

The problems outlined above are in large part solved by the use the system and method described herein. Generally speaking, a system and method for detecting parity errors in a system where clients are configured to arbitrate amongst themselves for a grant to a central resource is provided. A client may send a request for access to the central resource to all other clients. In the event that multiple clients request access to the central resource substantially simultaneously, the clients may each determine which client should be granted the right to send its request to the central resource. The clients may make this determination according to an arbitration scheme. Where multiple requests occur substantially simultaneously, each client may calculate a parity based on the number of requests it receives. The clients may each convey their parity to the central resource. The clients may convey these parities to the central resource at about the same time as the transaction corresponding to the granted request is conveyed to the central resource by its respective client. The central resource may determine that an error has occurred based on the parities received from the clients. If an error occurs, the central resource may generate an error signal and convey the error signal to a system controller.

The system and method described herein may provide advantages over other systems. For example, the hardware needed to implement the system may be reduced since each client may need to convey its parity calculation to a central resource instead of to every other client. Accordingly, each client may need only one parity line connected to the central resource as opposed to a parity line connected to every other client. In this manner, the number of parity lines may increase in a linear manner when new clients are added to the system as opposed to increasing exponentially. The system and method may also allow a single parity error detection circuit to be located in the central resource. Since the central resource may calculate parity errors for all of the clients, each client may no longer need to include parity error detection circuit. Accordingly, the hardware or software at each client may be reduced.

BRIEF DESCRIPTION OF THE DRAWINGS

Other objects and advantages of the invention will become apparent upon reading the following detailed description and upon reference to the accompanying drawings in which.

Figure 1:
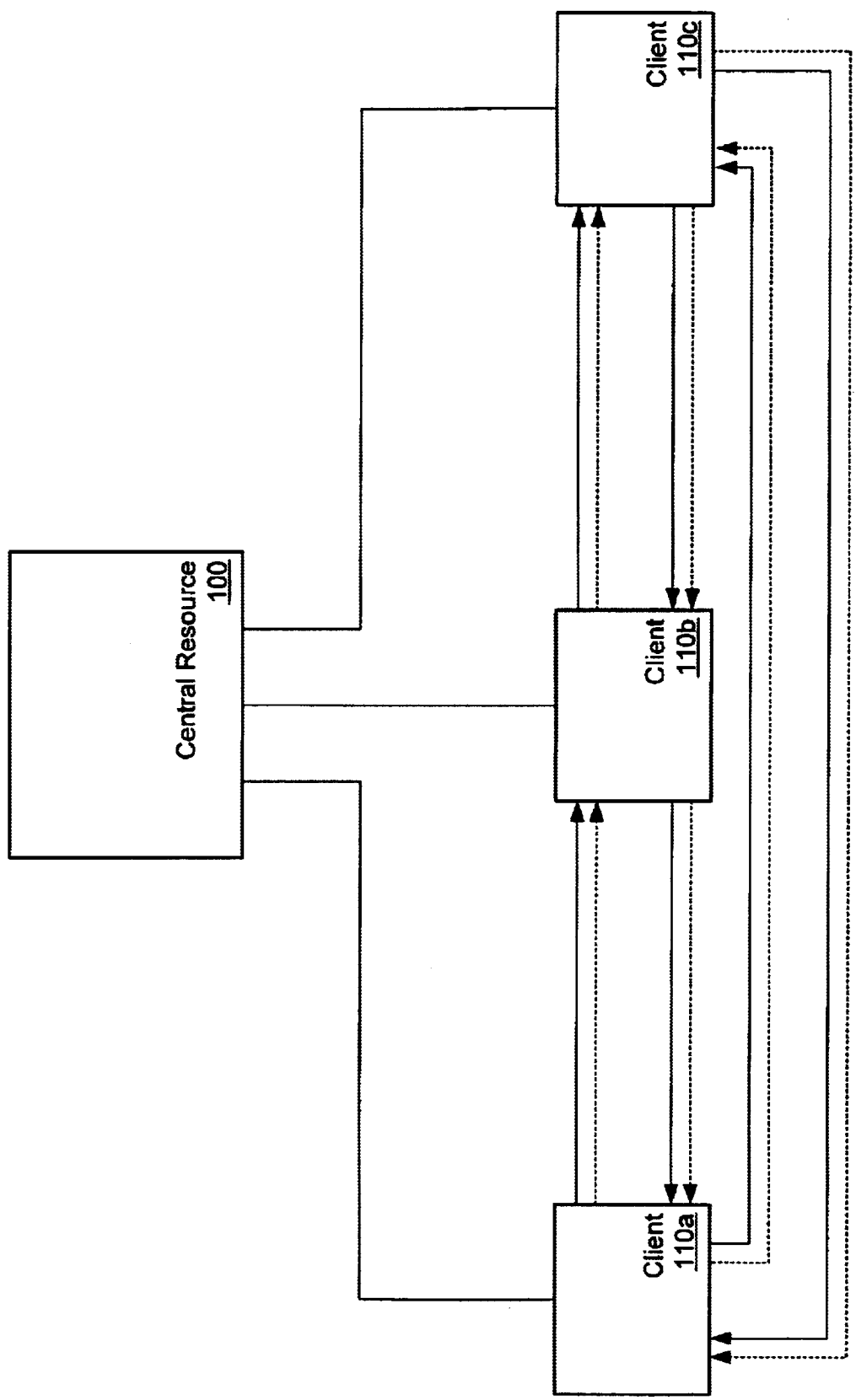
FIG. 1 is a block diagram illustrating a prior art embodiment of clients configured to arbitrate amongst themselves for a grant to a central resource.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF AN EMBODIMENT

Figure 2:
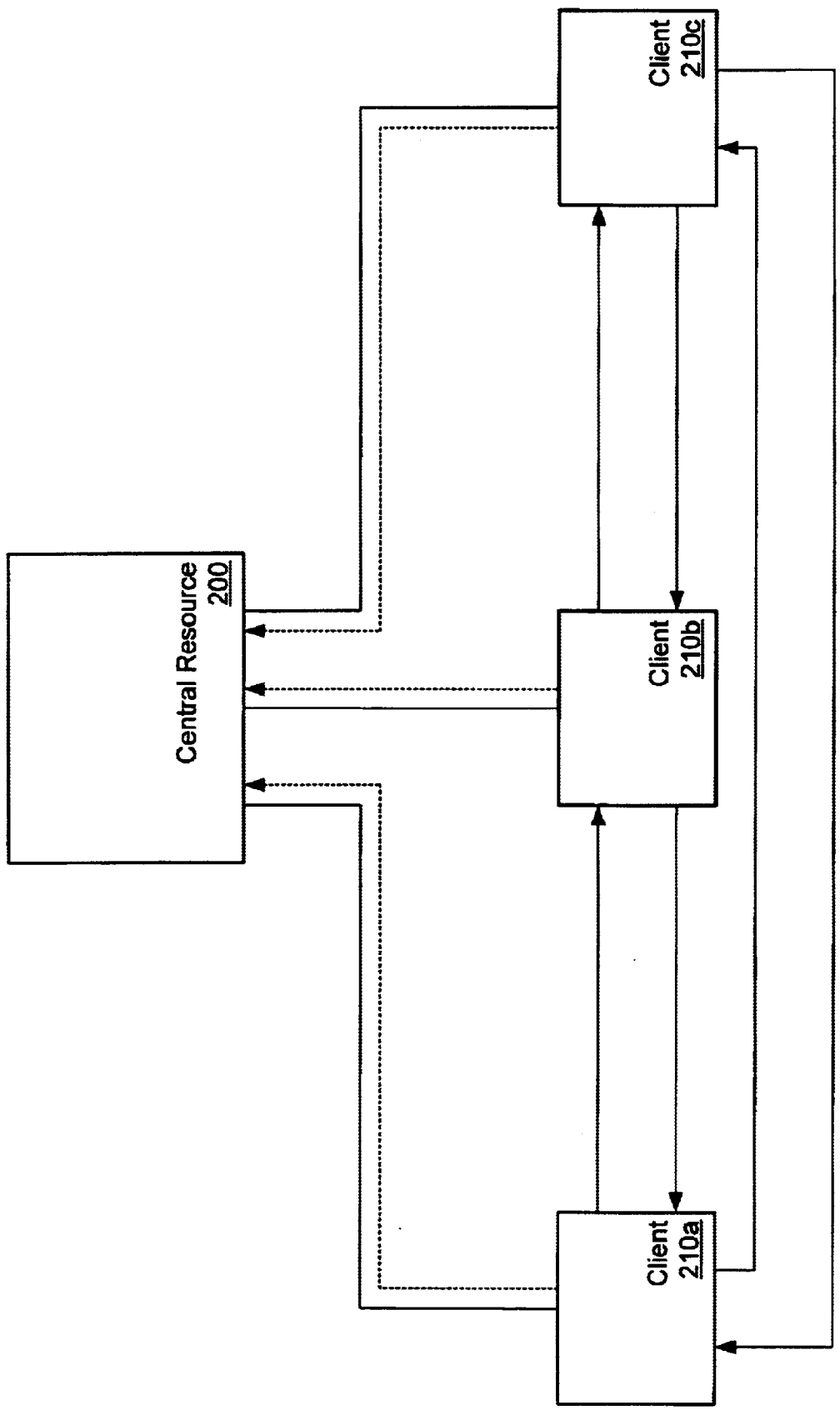
FIG. 2 is a block diagram illustrating one embodiment of clients configured to arbitrate amongst themselves for a grant to a central resource.

Turning now to FIG. 2, a block diagram illustrating one embodiment of clients configured to arbitrate amongst themselves for a grant to a central resource is shown. Other embodiments are possible and contemplated. FIG. 2 depicts clients 210a, 210b, and 210c coupled to each other and to central resource 200. The connections between clients 210a, 210b, and 210c include request lines as indicated by the solid lines connecting the clients. The connections between clients 210a, 210b, and 210c and central resource 200 include request lines as indicated by the solid lines and parity lines as indicated by the dotted lines. These connections are shown for illustrative purposes and other interconnections are possible and contemplated.

The embodiment of FIG. 2 may be configured to detect parity errors in a system where clients 210a, 210b, and 210c are configured to arbitrate amongst themselves for a grant to central resource 200. Each client 210a, 210b, and 210c may be configured to send a request for access to central resource 200 to all other clients using the request lines that are shown in FIG. 2. In the event that two or more of clients 210a, 210b, and 210c request access to central resource 200 substantially simultaneously, each of clients 210a, 210b, and 210c may each determine which client should be granted the right to send its request to central resource 200. Clients 210a, 210b, and 210c may make this determination according to the same arbitration scheme. The arbitration scheme may be any suitable static or dynamic arbitration scheme such as a round robin scheme.

As used herein, requests may be said to occur "substantially simultaneously" when they would conflict if sent by their respective clients to central resource 200. Thus, in certain embodiments, "substantially simultaneously" may refer to the condition where two or more requests are conveyed from their respective clients to the other clients in the same or adjacent clock cycles. In other embodiments, "substantially simultaneously" may refer to conditions based on factors other than the clock cycle in which the requests are conveyed.

Where multiple requests occur substantially simultaneously, each client 210a, 210b, and 210c may calculate a parity based on the number of requests it receives. Any type of parity may be used, such as odd parity or even parity. In one embodiment, the parity calculation may not include a client's own request. For example, if clients 210a, 210b, and 210c all conveyed a request to one another substantially simultaneously, client 210a may calculate a parity based only on the requests from clients 210b and 210c and not based on the request from client 210a. If odd parity is used in this example, client 210a would calculate a parity of one since it received two requests (one from client 210b and one from client 210c). Similarly, if client 210a only received one request from clients 210b and 210c, it would calculate a parity of zero using odd parity. In other embodiments, a client's own request may be included in its parity calculation.

Clients 210a, 210b, and 210c may each convey their calculated parity to central resource 200. These parities may be conveyed using the parity lines shown in FIG. 2. Clients 210a, 210b, and 210c may be configured to convey these parities to central resource 200 at about the same time as the transaction corresponding to the granted request is conveyed to central resource 200 by its respective client. For example, if clients 210a, 210b, and 210c all conveyed a request to one another substantially simultaneously and each client determined that the request from client 210b should be granted according to the arbitration scheme, then client 210b would convey its request to central resource 200. In addition, each client 210a, 210b, and 210c would calculate and convey a parity to central resource level 200 at about the same time that client 210b conveyed its request to central resource 200. Depending on the implementation, clients 210a, 210b, and 210c may convey their respective parities in the same clock cycle as or in a clock cycle before or after the clock cycle in which client 210b conveys its request to central resource 200.

Central resource 200 may determine that an error has occurred based on the parities received from clients 210a, 210b, and 210c. More particularly, central resource 200 may detect broken links in the request lines between clients 210a, 210b, and 210c. In the example in the last paragraph, if each client received all of the requests from the other clients, then each client would each receive two requests and would calculate a parity of one if odd parity was being used. Accordingly, central resource 200 would expect to see a one conveyed on each client's parity line. If central resource 200 did not see a one on each client's parity line, then an error likely occurred. If an error occurs, central resource 200 may generate an error signal and convey the error signal to a system controller (not shown).

The system shown in FIG. 2 may provide advantages over other systems. For example, fewer parity lines may be required as can be seen by comparison with FIG. 1. In FIG. 1, six parity lines may be required while only three parity lines may be required in FIG. 2. In addition, the number of parity lines may increase in a linear manner when new clients are added to the system of FIG. 2 as opposed to increasing exponentially in the system of FIG. 1. The system of FIG. 2 may also allow a single parity error detection circuit to be located in central resource 200. Since central resource 200 may calculate parity errors for all of the clients, each client may no longer need to include parity error detection circuit as may be required in he system of FIG. 1. Accordingly, the hardware or software at each client may be reduced.

FIG. 2 is shown with three clients, clients 210a, 210b, and 210c, for illustrative purposes. Other embodiments may include any number of clients coupled to central resource 200.

Figure 3:
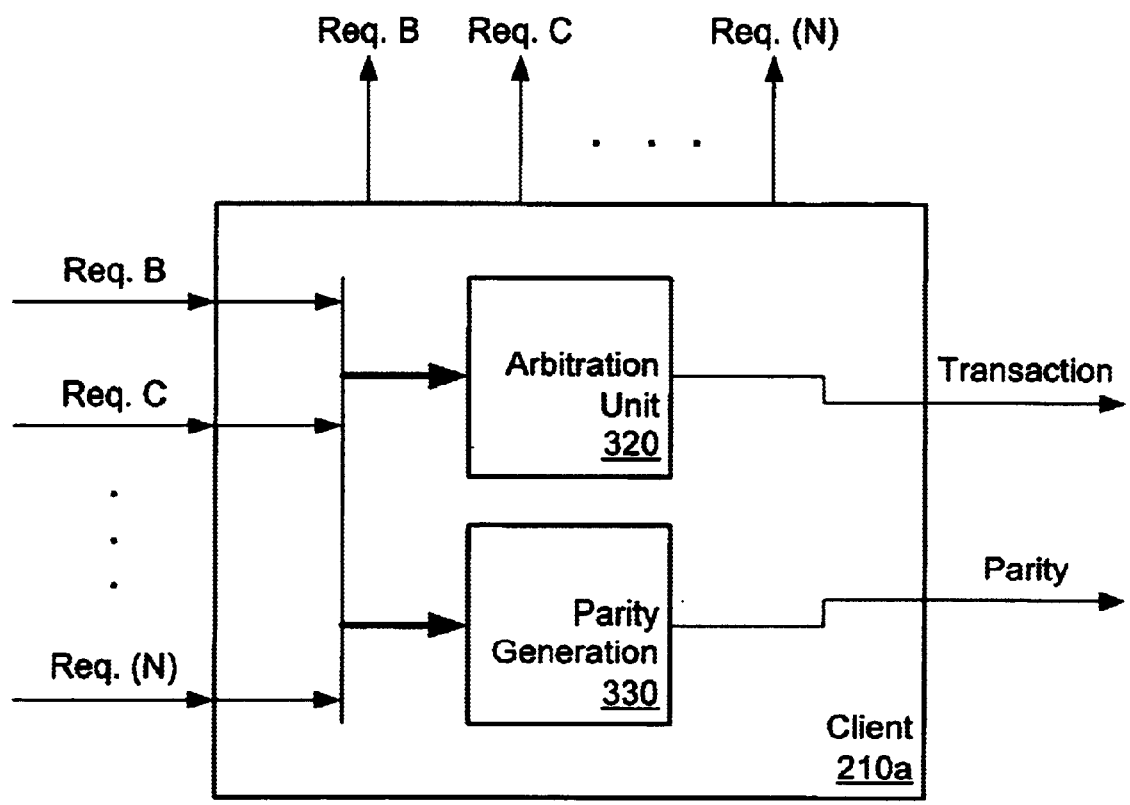
FIG. 3 is a block diagram illustrating portions of one embodiment of a client.

Turning now to FIG. 3, a block diagram illustrating portions of one embodiment of a client is shown. Other embodiments are possible and contemplated. FIG. 3 depicts client 210a including arbitration unit 320 and parity generation 330. Client 210a is configured to receive request lines from other clients as indicated by the input lines "Req. B", "Req. C", and "Req. (N)". The input "Req. B" may be from client 210b and the input "Req. C" may be from client 210c, for example. The dots between "Req. C" and "Req. (N)" are intended to indicate that client 210a may receive a number of request lines equal to the number of other clients where N is intended to indicate the alphabetic character of the last client. If 26 clients were included in the system include client 210a, for example, "Req. (N)" would correspond to "Req. Z". Similarly, client 210a is configured to convey its requests to other clients as indicated by the output lines "Req. B", "Req. C", and "Req. (N)". Client 210a is also configured to convey a transaction and panty to a central resource as indicated by the outputs on the right hand side of FIG. 3.

Arbitration unit 320 and parity generation 330 may receive the request inputs from other clients. In response to receiving multiple requests, possibly including a request from client 210a, arbitration unit 320 may determine which request is to be granted access to a central resource according to an arbitration scheme as discussed above. If the request to be granted access is a request from client 210a itself, arbitration unit 320 may be configured to cause the a transaction corresponding to the request to be conveyed to the central resource on the transaction output shown in FIG. 3.

Parity generation 330 may calculate a parity and convey the parity to a central resource using the parity output shown. Parity generation 330 may calculate the parity based on the number of requests it receives from other clients and may use any type of parity calculation such as odd parity or even parity.

Figure 4:
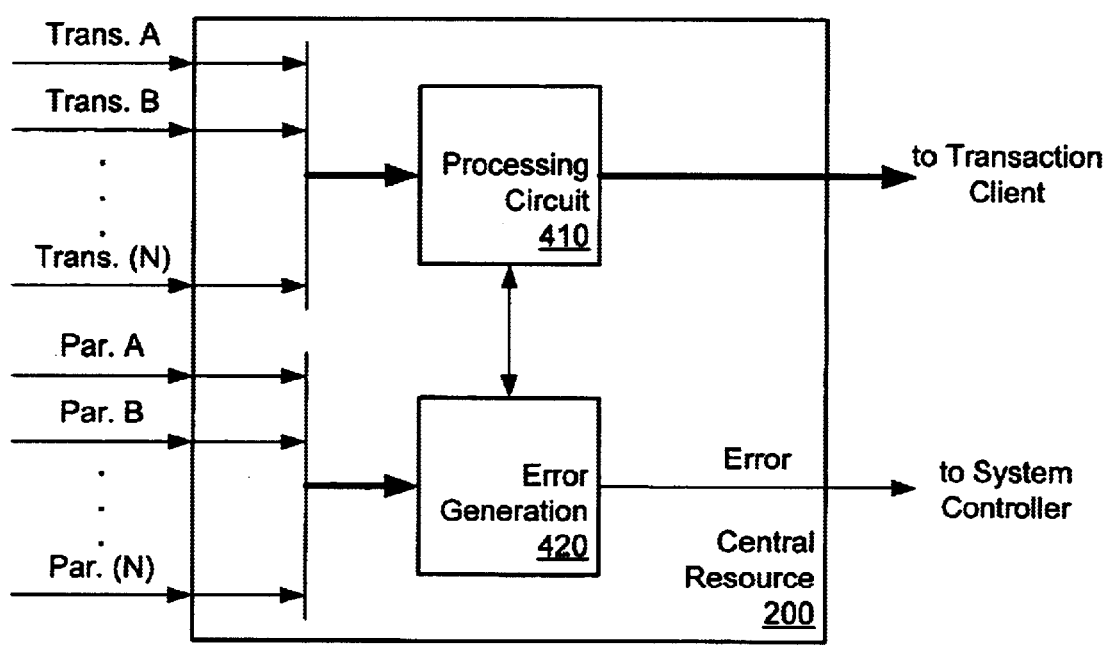
FIG. 4 is a block diagram illustrating portions of one embodiment of a central resource.

Turning now to FIG. 4, a block diagram illustrating portions of one embodiment of a central resource is shown. Other embodiments are possible and contemplated. FIG. 4 depicts central resource 200 including processing circuit 410 coupled to error generation 420. Central resource 200 is configured to receive transactions from each client in a system as indicated by the input lines "Trans. A", "Trans. B", and "Trans. (N)". The dots between "Trans. B" and "Trans. (N)" are intended to indicate that central resource 200 may receive a number of request lines equal to the number of clients where N is intended to indicate the alphabetic character of the last client. Similarly, central resource 200 is configured to receive parity lines from each client in the system as indicated by the input lines "Par. A", "Par. B", and "Par. (N)". The dots between "Par. B" and "Par. (N)" are intended to indicate that central resource 200 may receive a number of parity lines equal to the number of clients where N is intended to indicate the alphabetic character of the last client.

Processing circuit 410 may be configured receive the requests from each client in the system. Processing circuit 410 may generate an output corresponding to a transaction received and that output may be conveyed to the client that conveyed the transaction as indicated.

Error generation 420 may be configured to receive the parities from each client in the system. Error generation 420 may also receive information regarding a request from processing circuit 410. Error generation 420 may use the parities and the information regarding a request to determine if an error has occurred with the clients. More particularly, error generation 420 may detect broken links in the request lines between clients by comparing the parities received from each client and the information regarding the request. Since each parity represents the number of requests that a client saw, error generation 420 may identify an error where a client's parity does not match an expected value based on the parities from the other clients. When this occurs, error generation 420 may generate an error signal and convey the error signal to a system controller (not shown) as indicated.

Figure 5A:
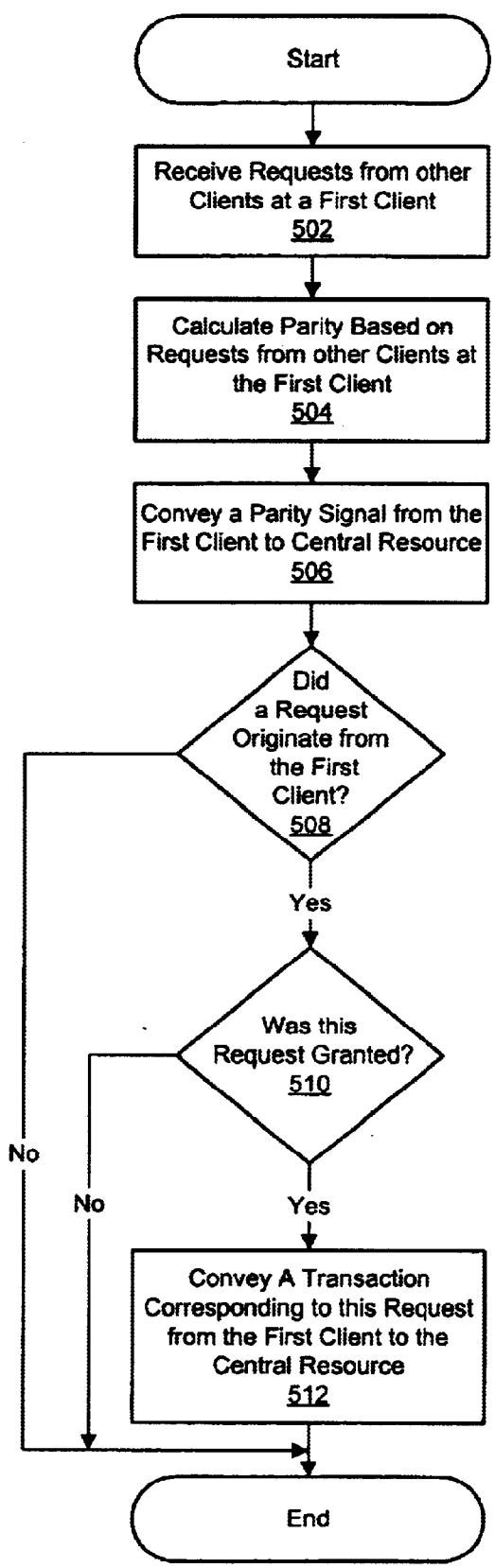
FIG. 5a is a flow chart illustrating a method for generating parity at a client in a system where clients are configured to arbitrate amongst themselves for a grant to a central resource.

Turning now to FIG. 5a, a flow chart illustrating a method for generating parity at a client in a system where clients are configured to arbitrate amongst themselves for a grant to a central resource is shown. Variations on the method are possible and contemplated. Requests may be received from other clients at a first client as indicated in block 502. Parity may be calculated based on the requests from the other clients at the first client as indicated in block 504. A parity signal may be conveyed from the first client to a central resource as indicated in block 506.

In block 508, a determination may be made as to whether a request originated from the first client. If a request originated from the first client, then a determination may be made as to whether the request of the first client was granted access to the central resource for this request as indicated in block 510. It can be noted that the first client may make this determination according to any suitable arbitration scheme as discussed above. If the first client was granted access to the central resource for this request, then a transaction corresponding to the request may be conveyed to the central resource as indicated in block 512. If a request did not originate from the first client as determined in block 508 or a request of the first client was not granted access to the central resource as determined in block 510, then the action indicated in block 512 may not be performed.

Figure 5B:
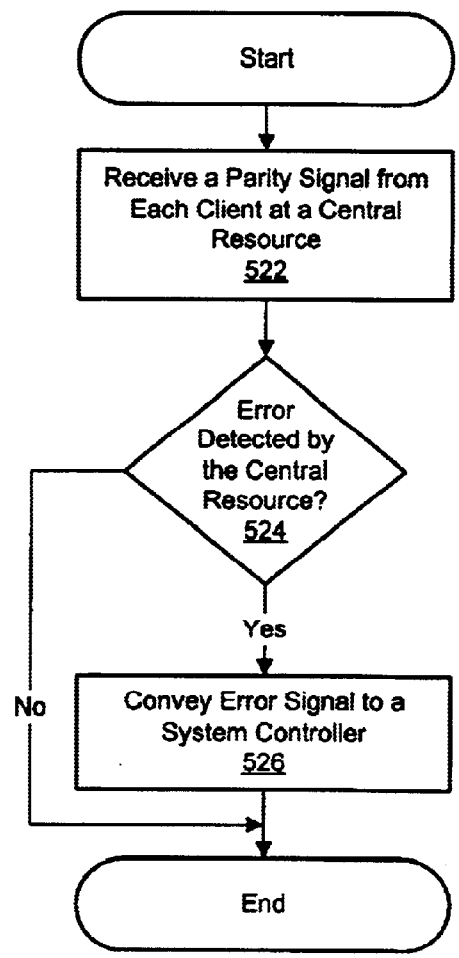
FIG. 5b is a flow chart illustrating a method for detecting errors in a system where clients are configured to arbitrate amongst themselves for a grant to a central resource.

Turning now to FIG. 5b, a flow chart illustrating a method for detecting errors in a system where clients are configured to arbitrate amongst themselves for a grant to a central resource is shown. Variations on the method are possible and contemplated. A parity signal may be received from each client at a central resource as indicated in block 522. A determination may be made as to whether an error has been detected by the central resource as indicated in block 524. If an error has been detected by the central resource, then an error signal may be conveyed to a system controller as indicated in block 526. If an error has not been detected by the central resource, then the action indicated in block 526 may not be performed.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications.

I claim:

1. A system comprising:
   a central resource; and
   a first client coupled to said central resource;
   a second client coupled to said central resource and said first client;
   wherein said first client and said second client are each configured to select a first request from said first client or a second request from said second client to be conveyed to said central resource in response to said first request and said second request occurring substantially simultaneously, wherein said first client is configured to generate a first parity, wherein said second client is configured to generate a second parity, wherein said first client is configured to convey said first parity to said central resource, and wherein said second client is configured to convey said second parity to said central resource.

2. The system of claim 1, wherein said first client is configured to convey said first request to said second client prior to said first request or said second request being conveyed to said central resource, and wherein said second client is configured to convey said second request to said first client prior to said first request or said second request being conveyed to said central resource.

3. The system of claim 2, wherein said first client is configured to generate said first parity in response to said second request, and wherein said second client is configured to generate said second parity in response to said first request.

4. The system of claim 1, wherein said first parity and said second parity are conveyed to said central resource substantially simultaneously with said first request or said second request being conveyed to said central resource.

5. The system of claim 1, wherein said wherein said first client and said second client are configured to select said first request or said second request to be conveyed to said central resource according to an arbitration scheme.

6. The system of claim 1, wherein said central resource is configured to generate an error signal in response to determining that a value of either said first parity or said second parity differs from an expected value.

7. The system of claim 6, further comprising:
a system controller coupled to said central resource;
wherein said central resource is configured to convey said error signal to said system controller.

8. The system of claim 1, further comprising:
a third client coupled to said first client, said second client, and said central resource;
wherein said third client is configured to receive said first request and said second request, wherein said third client is configured to generate a third parity, and wherein said third client is configured to convey said third parity to said central resource.

9. The system of claim 8, wherein said central resource is configured to generate an error signal in response to said first parity, said second parity, and said third parity.

10. The system of claim 8, wherein said first parity, said second parity, and said third parity are conveyed to said central resource substantially simultaneously with said first request or said second request being conveyed to said central resource.

11. The system of claim 8, wherein said wherein said first client, said second client, and said third client are each configured to select said first request, said second request, or a third request from said third client to be conveyed to said central resource in response to said first request, said second request, and said third request occurring substantially simultaneously.

12. The system of claim 11, wherein said first client is configured to generate said first parity in response to said second request and said third request, wherein said second client is configured to generate said second parity in response to said first request and said third request, and wherein said third client is configured to generate said third parity in response to said first request and said second request.

13. A method comprising:
conveying a first request from a first client to a second client;
conveying a second request from said second client to said first client;
selecting said first request or said second request to be conveyed to a central resource in response to said conveying said second request occurring substantially simultaneously with said conveying said first request;
generating a first parity at said first client;
generating a second parity at said second client; and
conveying said first parity and said second parity to said central resource.

14. The method of claim 13, further comprising:
generating said first parity in response to said second request; and
generating said second parity in response to said first request.

15. The method of claim 13, further comprising:
conveying said first request or said second request to said central resource; and
conveying said first parity and said second parity to said central resource substantially simultaneously with said conveying said first request or said second request to said central resource.

16. The method of claim 13, wherein said selecting further comprises:
selecting said first request or said second request to be conveyed to said central resource according to an arbitration scheme.

17. The method of claim 13, further comprising:
generating an error signal at said central resource in response to said first parity and said second parity.

18. The method of claim 17, further comprising:
conveying said error signal to a system controller.

19. The method of claim 13, further comprising:
receiving said first request and said second request at a third client;
generating a third parity at said third client; and
conveying said third parity to said central resource.

20. The method of claim 19, further comprising:
generating an error signal at said central resource in response to said first parity, said second parity, and said third parity.

21. The method of claim 19, further comprising:
conveying a third request from said third client to said first client and said second client; and
selecting said first request, said second request, or said third request to be conveyed to a central resource in response to said conveying said second request, said conveying said first request, and said conveying said third request occurring substantially simultaneously.

22. The method of claim 21, further comprising:
generating said first parity in response to said second request and said third request;
generating said second parity in response to said first request and said third request; and
generating said third parity in response to said first request and said second request.

* * * * *